Dec. 10, 1963 R. D. GIBNEY 3,113,378
METHOD OF MAKING A SLACK ADJUSTER NUT
Original Filed Aug. 29, 1958
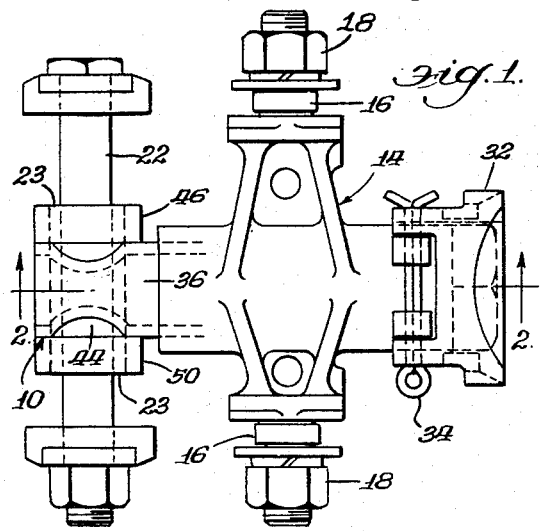
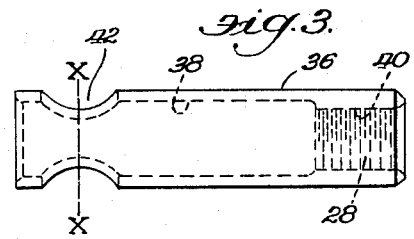
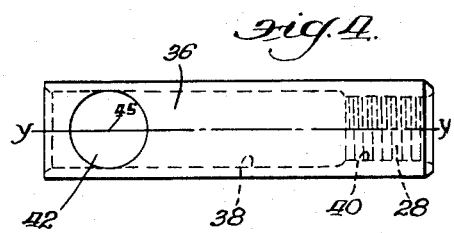
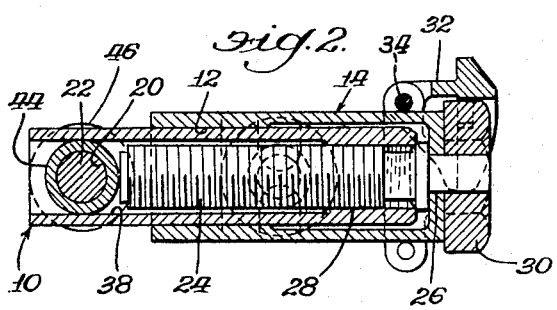
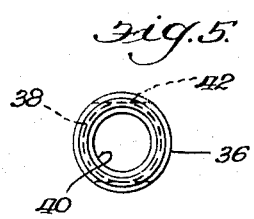
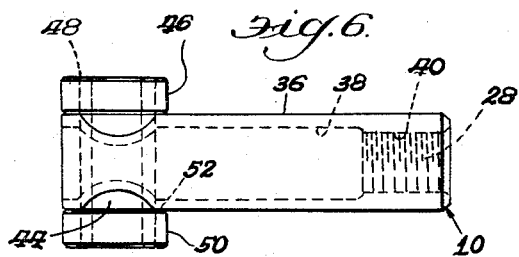
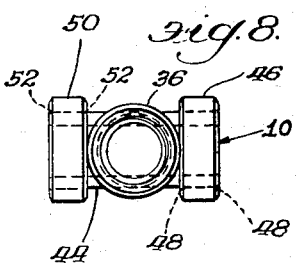
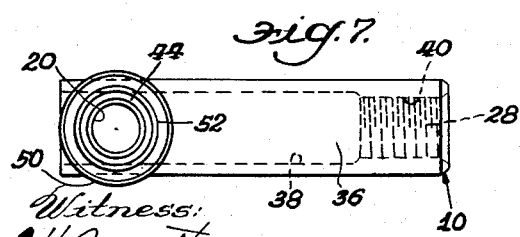
Inventor:
Robert D. Gibney
By Walter L. Schlegel Jr.
Atty.
Witness:
C. H. Barrett

3,113,378
METHOD OF MAKING A SLACK ADJUSTER NUT

Robert D. Gibney, Munster, Ind., assignor to Amsted Industries Incorporated, Chicago, Ill., a corporation of New Jersey
Original application Aug. 29, 1958, Ser. No. 758,136, now Patent No. 3,065,648, dated Nov. 27, 1962. Divided and this application July 19, 1961, Ser. No. 125,223
2 Claims. (Cl. 29—525)

This invention relates to method of making slack adjusters for railway brake rigging.

This application is a division of my copending application filed August 29, 1958, Serial No. 758,136, now Patent Number 3,065,648.

A primary object of the invention is to devise a nut which is economical to manufacture and has the capacity for long life under the impacts and vibrations of railway service.

A more specific object of the invention is to fabricate a nut from parts which can be quickly and economically produced in a machine shop as distinguished from prior art nuts formed from castings.

A further object of the invention is to provide a foolproof assembly which can be fabricated by an unskilled operator with minimum risk of damage to the component parts.

The foregoing and other objects and advantages of the invention will become apparent from a consideration of the following specification and the accompanying drawings, wherein:

FIGURE 1 is a general assembly top plan view of a railway slack adjuster embodying a preferred form of the novel nut;

FIGURE 2 is a sectional view on line 2—2 of FIGURE 1;

FIGURE 3 is a top plan view of the longitudinal member of the nut;

FIGURE 4 is a side elevational view thereof;

FIGURE 5 is an end elevational view taken from the right as seen in FIGURES 3 and 4;

FIGURE 6 is a top plan view of the novel nut;

FIGURE 7 is a side elevational view thereof; and

FIGURE 8 is an end elevational view taken from the right as seen in FIGURES 6 and 7.

Describing the invention in detail and referring first to FIGURES 1 and 2, the novel slack adjuster housing nut generally designated 10 is slidably mounted at 12 in a body 14 which may be formed as a casting comprising trunnions 16 with nuts 18 threaded thereon to maintain a brake lever or levers (not shown) on the trunnions which are received within complementary openings of the lever or levers.

The novel nut 10 comprises a transverse bore or aperture 20 for the reception of a bolt and nut assembly 22 to maintain brake lever connector straps (not shown) in snug abutment with oppositely facing seats 23 at one end of the nut.

The distance between the trunnions 16 and the bolt and nut assembly 22 is adjusted during adjustment of slack in the brake rigging (not shown) by a screw 24 rotatably journaled at 26 in the body 14 and in threaded engagement at 28 with the novel nut 10.

A hexagonal head 30 is shrunk on the screw 24 for convenient actuation thereof, and a releasable lock or latch 32 is pivoted as by a cotter 34 to the body, to lock the screw against accidental rotation due to impacts and vibration under railway service conditions.

Referring now to FIGURES 3 to 8, the novel nut 10 will be described in detail by describing the novel method of fabricating this part.

An elongated member 36 preferably in the form of a segment of cylindrical bar stock is first drilled to provide an elongated passage 38 extending lengthwise of the member. A drilling tool is then advanced through the passage 38 to form a passage 40 which is preferably of smaller diameter than passage 38. The passage 40 is then threaded at 28. A transverse passage 42 is then drilled through the member 36 adjacent its end remote from the threads 28, the passage 42 being of greater diameter than the passage 38, as best seen in FIGURE 4, to afford maximum bearing for a tube 44 which is press-fitted in the passage 42 with the ends of the tube projecting therefrom.

The axis X—X (FIG. 3) of passage 42 intersects axis Y—Y (FIG. 4) of passage 38, as at 45 (FIG. 4) so that the top and bottom of tube 44 bear continuously against the member 36 within the passage 42.

A washer 46 having an inner diameter chamfered or flared at 48 is then press-fitted on one end of the tube preferably until the washer bears snugly against the member 36 without crushing or otherwise deforming the latter. A second washer 50 preferably identical with washer 46 and having an inner diameter chamfered or flared at 52 is then press-fitted on the opposite end of the tube preferably until the washer 48 bears snugly against the member 36 without crushing or otherwise deforming the latter. It has been discovered according to the invention that the washers are preferably press-fitted one at a time on the tube 44 as above described so that the operator who assembles the novel nut can do so without crushing the member 36 as the washers are press-fitted into assembled positions shown in FIGURES 6 to 8.

The chamfered or flared inner diameters of the washers function as guides to ensure a proper fit of the washers on the tube 44, inasmuch as the slightest deviation from a coaxial relationship between the tube and washers may result in crushing of the member 38 by one edge of a washer.

I claim:
1. The method of making a slack adjuster nut, which comprises providing an elongated tubular member with a longitudinal bore extending the length of said member, internally threading the bore of said member adjacent one end thereof, drilling a transverse passage of larger diameter than the diameter of the bore of said member through the member adjacent the other end thereof, press-fitting a relatively short tube of an external shape complementary to the shape of the transverse passage into the transverse passage to provide a fluid-tight seal between the ends of said member, and press-fitting washers over the ends of said tube and into abutting engagement against opposite sides of said member to provide oppositely facing annular seats.

2. The method of making a slack adjuster nut, which comprises providing an elongated tubular member with a longitudinal bore extending the length of said member, internally threading the bore of said member adjacent one end thereof, drilling a transverse passage of larger diameter than the diameter of the bore of said member through the member adjacent the other end thereof, press-fitting a relatively short tube of an external shape complementary to the shape of the transverse passage into the transverse passage to provide a fluid tight seal between the ends of said member, and press-fitting washers one at a time over the ends of said tube and into abutting engagement against opposite sides of said member to provide oppositely facing annular seats flush with the ends of said tube.

References Cited in the file of this patent
UNITED STATES PATENTS

| | | |
|---|---|---|
| 2,101,707 | Ewing | Dec. 7, 1937 |
| 2,983,158 | Hodlewsky | May 9, 1961 |